United States Patent
Keller et al.

(10) Patent No.: US 9,924,414 B2
(45) Date of Patent: Mar. 20, 2018

(54) SESSION TRANSFER FROM A CIRCUIT SWITCHED NETWORK TO A PACKET SWITCHED NETWORK

(71) Applicant: Telefonaktiebolaget L M Ericsson (publ), Stockholm (SE)

(72) Inventors: Ralf Keller, Würselen (DE); Peter Hedman, Helsingborg (SE); Fredrik Lindholm, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/401,150

(22) PCT Filed: May 15, 2013

(86) PCT No.: PCT/EP2013/060048
§ 371 (c)(1),
(2) Date: Nov. 14, 2014

(87) PCT Pub. No.: WO2013/171267
PCT Pub. Date: Nov. 21, 2013

(65) Prior Publication Data
US 2015/0110069 A1    Apr. 23, 2015

Related U.S. Application Data

(60) Provisional application No. 61/647,108, filed on May 15, 2012.

(51) Int. Cl.
*H04L 12/28* (2006.01)
*H04W 36/00* (2009.01)

(52) U.S. Cl.
CPC ............. *H04W 36/0022* (2013.01)

(58) Field of Classification Search
USPC .......... 370/329, 330, 331, 333, 338
See application file for complete search history.

(56) References Cited

U.S. PATENT DOCUMENTS

2010/0265914 A1* 10/2010 Song ............... H04W 48/18
                                                     370/331
2011/0164564 A1*  7/2011 Vedrine ........... H04W 36/0033
                                                     370/328

(Continued)

FOREIGN PATENT DOCUMENTS

| CN | 102273264 A | 12/2011 |
| CN | 102387557 A | 3/2012 |
| WO | 2013152671 A1 | 10/2013 |

OTHER PUBLICATIONS

3rd Generation Partnership Project, "3rd Generation Partnership Project; Technical Specification Group Services and System Aspects; Single Radio Voice Call Continuity (SRVCC); Stage 2 (Release 11)", Technical Specification, 3GPP TS 23.216 V11.4.0, Mar. 1, 2012, pp. 1-64, 3GPP, France.

(Continued)

*Primary Examiner* — Zewdu A Beyen
(74) *Attorney, Agent, or Firm* — Coats & Bennett, PLLC (57) ABSTRACT

The invention relates to methods and nodes for supporting a session transfer, for a user equipment, from a circuit switched network to a packets witched network. According to one aspect a method for operating a control node of a core network is provided. The method comprises the steps: requesting from a radio access network of the circuit switched network information on whether a capability of the user equipment related to the session transfer are compatible with a network configuration related to the session transfer; receiving from the radio access network an indication whether the capability of the user equipment and the network configuration are compatible; determining whether to (Continued)

indicate that the session transfer is supported by using the received compatibility indication; and setting an indication whether the session transfer is supported according to the determination.

20 Claims, 7 Drawing Sheets

(56) References Cited

U.S. PATENT DOCUMENTS

| | | |
|---|---|---|
| 2011/0249652 A1 | 10/2011 | Keller et al. |
| 2012/0165019 A1* | 6/2012 | Shintani ............ H04W 36/0022 455/436 |
| 2013/0128865 A1 | 5/2013 | Wu et al. |

OTHER PUBLICATIONS

3rd Generation Partnership Project, "3rd Generation Partnership Project; Technical Specification Group Services and System Aspects; IP Multimedia Subsystem (IMS) Service Continuity; Stage 2 (Release 11)", Technical Specification, 3GPP TS 23.237 V11.2.0, Sep. 1, 2011, pp. 1-154, 3GPP, France.

3rd Generation Partnership Project, "3rd Generation Partnership Project; Technical Specification Group Services and System Aspects; IP Multimedia Subsystem (IMS); Stage 2 (Release 11)", Technical Specification, 3GPP TS 23.228 V11.2.0, Sep. 1, 2011, pp. 1-274, 3GPP, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 11)", Technical Specification, 3GPP TS 23.401 V11.1.0, Mar. 1, 2012, pp. 1-284, 3GPP, France.

3rd Generation Partnership Project, "3rd Generation Partnership Project; Technical Specification Group Services and System Aspects; General Packet Radio Service (GPRS); Service description; Stage 2 (Release 11)", Technical Specification, 3GPP TS 23.060 V11.1.0, Mar. 1, 2012, pp. 1-332, 3GPP, France.

Ericsson et al., UE AS capability request over Iu, Change Request, SA WG2 Meeting #90, Apr. 19, 2012, pp. 1-24, S2-121903 (revision of S2-121648), 3GPP.

3rd Generation Partnership Project, "3rd Generation Partnership Project; Technical Specification Group Services and System Aspects; Single Radio Voice Call Continuity (SRVCC); Stage 2 (Release 11)", Technical Specification, 3GPP TS 23.216 V11.2.0, Sep. 1, 2011, pp. 1-53, 3GPP, France.

* cited by examiner

SESSION TRANSFER FROM A CIRCUIT SWITCHED NETWORK TO A PACKET SWITCHED NETWORK

TECHNICAL FIELD

The invention relates to methods and nodes for supporting a session transfer, such as a voice session, from a circuit switched network to a packet switched network. In particular it is focused on the support of transfer of a session from UTRAN/GERAN to E-UTRAN/HSPA.

BACKGROUND

Single Radio Voice Call Continuity (SRVCC) is a functionality that allows a VoIP (Voice over IP) or an IMS (IP Multimedia Subsystem) call in the packet domain, such as an LTE domain to be moved to a legacy circuit switched voice domain, such as GSM/UMTS or CDMA 1×.

As an example, SRVCC may function as follows: A user equipment (UE) that is SRVCC capable and that accesses an LTE network is engaged in a voice call. When the UE leaves the LTE coverage area it may be determined that the voice call is to be handed over to a legacy circuit switched domain and the voice call is then transferred from LTE to the circuit switched network.

According to 3GPP TS 23.216 V11.4.0 Single Radio Voice Call Continuity (SRVCC) may relate to voice call continuity between IMS (IP Multimedia Subsystem) over PS (Packet Switched) access and CS (Circuit Switched) access for calls that are anchored in IMS when the UE (User Equipment) is capable of transmitting/receiving on only one of those access networks at a given time.

Single Radio Video Call Continuity (vSRVCC) relates to video call continuity from E-UTRAN (evolved UMTS Terrestrial Radio Access Network) to UTRAN-CS for calls that are anchored in the IMS when the UE is capable of transmitting/receiving on only one of those access networks at a given time. The term vSRVCC refers to Single Radio Video Call Continuity.

Single Radio Voice Call Continuity (SRVCC) is discussed and specified in 3GPP TS 23.216 V11.4.0, entitled Single Radio Voice Call Continuity (SRVCC) and in 3GPP TS 23.237 V11.4.0, entitled IP Multimedia Subsystem (IMS) Service Continuity. IMS SIP (Session Initiation Protocol) signaling is discussed in 3GPP TS 23.228 V11.4.0, entitled IP Multimedia Subsystem. User Equipment Radio Capability Match procedures are discussed in 3GPP TS 23.401 V11.1.0 entitled General Packet Radio Service (GPRS) enhancements for Evolved Universal Terrestrial Radio Access Network (E-UTRAN) access and in 3GPP TS 23.060 V11.1.0 entitled General Packet Radio Service (GPRS), Service description.

While SRVCC often refers to the handover of a session from the packet switched domain to the circuit switched domain, in this application the opposite direction of a session transfer is considered, i.e. session transfer from the circuit switched domain to the packet switched domain will be the main focus. The concept of SRVCC from circuit switched to packet switched will thus also be referred to as rSRVCC, meaning return SRVCC or reverse SRVCC.

The current 3GPP specification TS23.216 V11.4.0 discusses in Section 5.3.2b an MSC (Mobile Switching Centre) enhanced for UTRAN/GERAN to E-UTRAN/UTRAN (HSPA) SRVCC; (UTRAN: UMTS Terrestrial Radio Access Network, GERAN: GSM EDGE Radio Access Network, E-UTRAN: evolved UTRAN, HSPA: High Speed Packed Access). According to this section, the MSC may inform the RAN (Radio Access Network) about the possibility to perform CS (Circuit Switched) to PS (Packet Switched) SRVCC by sending a "CS to PS SRVCC operation possible" to the RNC (Radio Network Controller) or alternatively to the BSC (Base Station Controller) only for normal TS 11 call (i.e. not an emergency call—TS 12, 3GPP TS 22.003). The MSC Server determines the possibility of performing CS to PS SRVCC based on: the CS to PS SRVCC capability of the UE, the presence of the CS to PS SRVCC allowed indication in the subscription data of the user, and the IMS registration status of the UE.

According to existing specification, the MSC Server indicates to the RAN that rSRVCC (SRVCC from CS to PS) is supported even if the UE does not support the actually required capabilities. For example, the network supports rSRVCC from UTRAN to LTE but the UE may only supports rSRVCC from GERAN to LTE. In such cases a handover or session transfer from the CS domain to the PS may fail or the call may even be lost or need to be recovered.

SUMMARY

Accordingly it is an object of the invention to obviate at least some of the above disadvantages and to provide improved methods and nodes for a session transfer from the circuit switched to the packet switched domain. The session transfer shall be reliable. Signaling overhead shall be minimized.

According to an embodiment of the invention, a method for operating a control node of a core network and for supporting, for a user equipment, a session transfer from a circuit switched network to a packet switched network is provided. The control node requests from a radio access network of the circuit switched network information on whether a capability of the user equipment related to the session transfer are compatible with a network configuration related to the session transfer. The control node receives from the radio access network an indication whether the capability of the user equipment and the network configuration are compatible. The control node determines whether to indicate that the session transfer is supported by using the received compatibility indication. The control node sets an indication whether the session transfer is supported according to the determination.

According to an embodiment of the invention, a method for operating a node of a radio access network for supporting, for a user equipment, a session transfer from a circuit switched network to a packet switched network is provided. The node receives from a control node of a core network a request of information on whether a capability of the user equipment related to the session transfer is compatible with a network configuration. The node checks whether the user equipment capability and the network configuration are compatible. The node indicates to the control node whether the user capability and the network configuration are compatible.

According to an embodiment of the invention, a control node for a core network and for supporting, for a user equipment, a session transfer from a circuit switched network to a packet switched network is provided. The control node comprises a network interface to request from a radio access network of the circuit switched network information on whether a capability of the user equipment related to the session transfer is compatible with a network configuration related to the session transfer and to receive from the radio access network an indication whether the capability of the user equipment and the network configuration are compatible. The control node further comprises a processor configured to determine whether to indicate that the session transfer is supported by using the received compatibility indication, and configured to set an indication whether the session transfer is supported according to the determination.

According to an embodiment of the invention, a node of a radio access network for supporting, for a user equipment, a session transfer from a circuit switched network to a packet switched network is provided. The node comprises a network interface for receiving, from a control node of a core network, a request of information on whether a capability of the user equipment related to the session transfer is compatible with a network configuration, and for indicating to the control node whether the user equipment capability and the network configuration are compatible. The node comprises further a processor configured to check whether the user equipment capability and the network configuration are compatible.

DETAILED DESCRIPTION OF EMBODIMENTS

In the following, the invention will be explained in more detail by referring to exemplary embodiments and to the accompanying drawings. The illustrated embodiments relate to concepts for a session transfer from a circuit switched network to a packet switched network, e.g. from UTRAN or GERAN to E-UTRAN or HSPA. This direction of session transfer is also referred to as return or reverse direction. As far as a voice session is concerned the return or reverse direction is referred to as rSRVCC (return/reverse SRVCC), or simply a CS to PS SRVCC.

Figure 1:
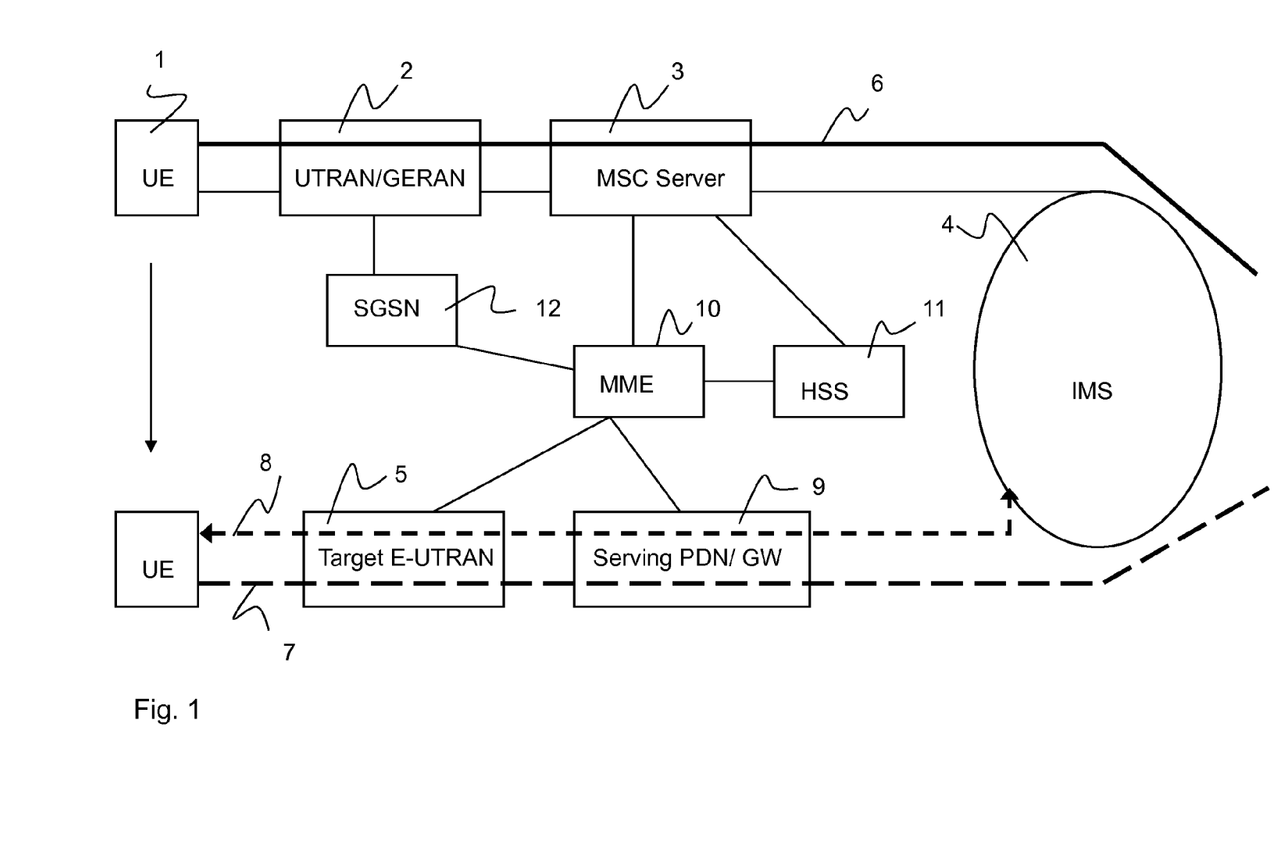
FIG. 1 schematically illustrates an exemplary network architecture according to the state of the art.

FIG. 1 schematically illustrates an exemplary network architecture in which a session transfer from a circuit switched network to a packet switched network can be performed. A similar structure is also presented in 3GPP TS 23.216 V11.4.0, Section 5.2.4.

In the example according to FIG. 1, a user equipment 1 is at first served by the circuit switched access network 2, e.g. UTRAN or GERAN. The access network 2 is connected to an MSC server 3 which is connected to an IMS 4. A session of the UE 1 is to be transferred from the circuit switched network 2 to a packet switched network 5, e.g. a Target-E-UTRAN. This example shows a bearer path 6 before the session transfer and a bearer path 7 and a signaling path 8 after the session transfer. After the session transfer, the bearer path 7 runs from the UE 1 via the packet switched network 5 (Target E-UTRAN) and a Serving/PDN Gateway 9 to the IMS 4. A Serving GPRS Support Node (SGSN) 12, a Mobility Management Entity (MME) 10 and a Home Subscriber Server (HSS) 11 may also be involved in signaling relevant for the session transfer. A core network in this example can be seen as the part of the architecture that resides between the circuit switched access network 2, the packet switched access network 5 and the IMS. The core network may generally be or comprise at least one of a circuit switched core network, a packet switched core network or an evolved packet core network. A network, in general, may comprise, depending on the context, at least one of a circuit switched access network, a packet switched access network, a circuit switched core network, and a packet switched core network.

Figure 2:
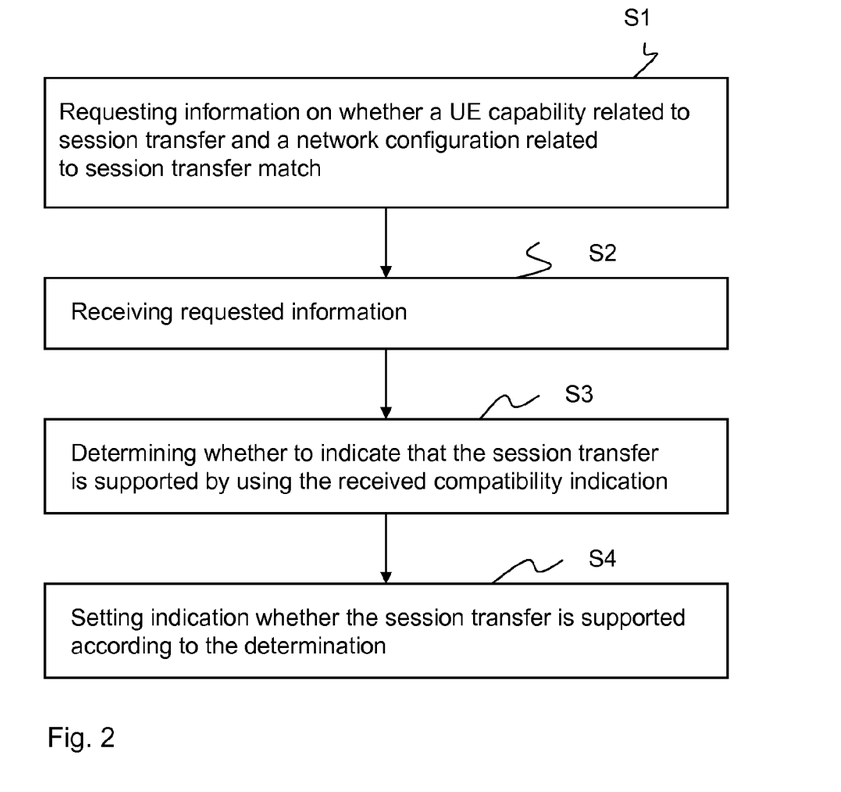
FIG. 2 shows a flowchart for illustrating a method in a control node of a core network according to one embodiment of the invention.

FIG. 2 shows a flowchart for illustrating a method in a control node of a core network according to one embodiment. The method supports a session transfer from a circuit switched to a packet switched network. A user equipment which is served by a radio access network of the circuit switched network uses the session.

Examples of circuit switched networks are GSM based networks and UMTS based networks. Each of which comprises an access network, e.g. GERAN type or UTRAN type, and a core network comprising several nodes such as an MSC server. An MSC server is an example of a control node of a core network.

Examples of packet switched networks are LTE based networks (E-UTRAN) and HSPA. The mentioned access networks are connected to a corresponding core network.

Session transfer comprises that a session is transferred or handed over from one access network or technology to another access network or technology. A session to be transferred can in particularly be a voice session or a video session. In this sense, the session transfer allows mobility of the user equipment between different access networks or technologies, including circuit switched access networks and packet switched access networks. A voice call is a session that can be transferred between the mentioned access networks or technologies.

In a step S1, the control node requests from a radio access network of the circuit switched network information whether a capability of the user equipment related to the session transfer are compatible with a network configuration related to the session transfer. A network configuration may be an operator configuration or a configuration set by an operator of the network. The network may comprise radio access network(s) and core network(s). The network configuration may concern a network capability of a network operator. In one example, the network comprises a circuit switched access network, a packet switched access network and a core network. For example, the control node may direct the request to a radio network controller (RNC) of a UTRAN or to a base station controller (BSC) of a GERAN.

The capability of the user equipment may be an rSRVCC capability of the UE, which indicates that a UE is capable to be transferred from a circuit switched to a packet switched network. Examples are the capability to be transferred from UTRAN to E-UTRAN, from GERAN to E-UTRAN, or from GERAN to HSPA. As several types of such access networks exist, e.g. TDD LTE or FDD LTE, the capability may also define whether the UE is capable to be transferred from a particular type of UTRAN/GERAN to a particular type of E-UTRAN/HSPA. The capability of the UE may also be that the UE is capable for Voice over a PS network such as UTRAN/E-UTRAN.

The capability of the user equipment may also or alternatively comprise the information whether the UE is capable for an FDD mode or a TDD mode or both of GERAN, UTRAN or E-UTRAN.

The capability of the user equipment may also or alternatively comprise at least one piece of information of the following group of pieces of information: the UE supports or does not support a certain frequency band of the GERAN/UTRAN and/or E-UTRAN, FDD and/or TDD for UTRAN, FDD and/or TDD for E-UTRAN, rSRVCC for GERAN to FDD and/or TDD HSPA, rSRVCC from FDD and/or TDD UTRAN to FDD/TDD HSPA, rSRVCC for GERAN to FDD and/or TDD E-UTRAN, and rSRVCC from FDD and/or TDD UTRAN to FDD/TDD E-UTRAN.

It is noted that not all possible information are mentioned that define the UE capability, however the skilled person will understand from the examples given above that the capability of the UE may comprise any kind of information that is related to a session transfer capability. The capability information may answers the question whether a certain mobility feature is supported, i.e. the transfer of a session from one network to another.

If the UE shows a certain capability and the network is also configured to support the capability or the network indicates support of the certain capability or mobility feature, than the network configuration related to session transfer and the capability of UE related to the session transfer match or are compatible.

For example, if the network is configured to support a particular rSRVCC for the UE or indicates that the particular rSRVCC of the UE is supported and if also the capability of the UE indicates that the particular rSRVCC is supported, than the UE capability and the network configuration match or are compatible. If the UE is not capable to support the particular rSRVCC than the UE capability and the rSRVCC do not match.

The control node may select a certain capability and indicate it to the radio access network. For example, the control node may be configured to support several types of session transfer, such as from GERAN to HSPA, from UTRAN to TDD-LTE and from UTRAN to FDD-LTE. When due to certain circumstances the control node is only interested whether a UE supports UTRAN to TDD-LTE than the control node may indicate that selected capability to the RAN. In this case not the entire capability information needs to be checked and signaled but only the selected capability is checked and signaled.

In step S2, the control node receives from the radio access network an indication whether the capabilities of the user equipment and the network configuration are compatible. This information can be a simple "yes" or "no."

In step S3, the control node determines whether to indicate that the session transfer is supported by using the received compatibility indication. Besides the received compatibility information the control node may take further information into account, e.g. information on network load, cell load, rSRVCC capability indicated by the HSS, priority or other information. The further information may be obtained from the network. Typically, the control node determines that session transfer is supported only if the compatibility indication is indicating that rSRVCC is supported and if none of the other information prevents the use of rSRVCC.

The control node can thus e.g. determine that the session transfer is not supported although the control node received the indication from the radio access network that the capabilities related to the session transfer of the UE are compatible with the network configuration.

In step S4, the control node sets an indication whether the session transfer is supported according to the determination. The control node may send the set indication to the radio access network.

The above described method can be seen as a match procedure between the control node of the core network and the RAN (radio access network) to match the capability of a UE served by the RAN and the network in view of a possible session transfer. Whether the control node finally indicates that the session transfer is supported depends on the outcome of the match procedure and may also depend on further information available at the control node.

The actual session transfer will only be performed if the control node has set the indication that the session transfer is supported. In this way it can be assured that the session transfer can only be performed if the user equipment and the network have matching capabilities related to the session transfer.

Figure 3:
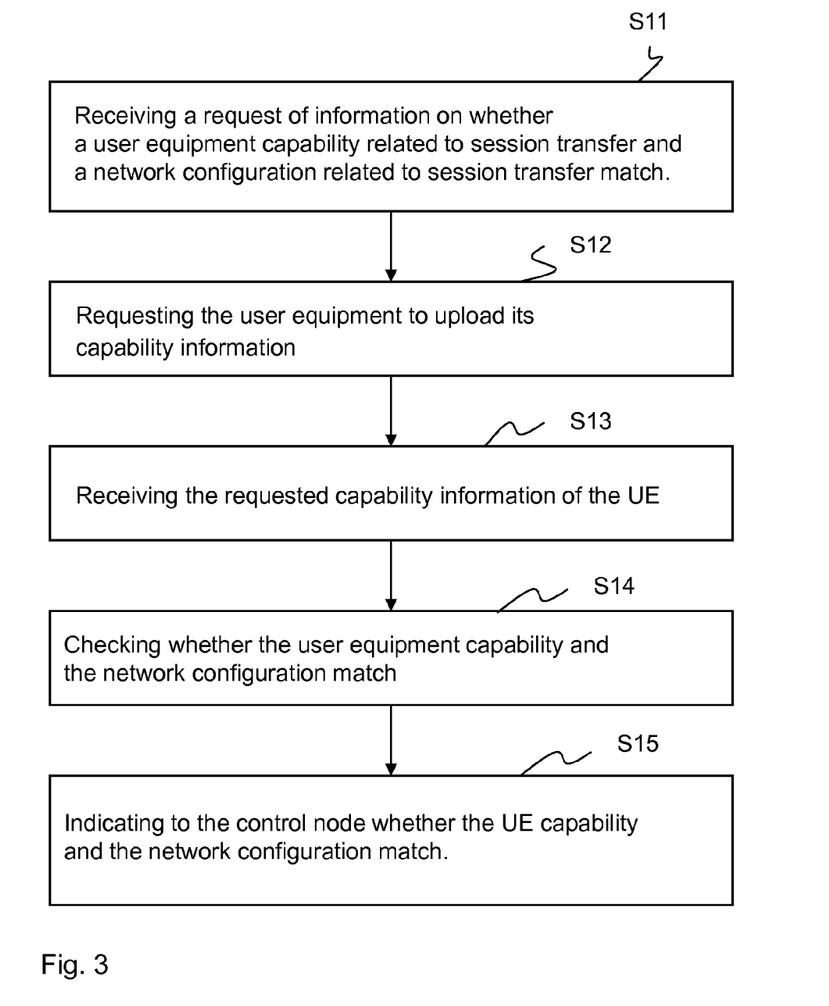
FIG. 3 shows a flowchart for illustrating a method in a radio access network according to one embodiment of the invention.

FIG. 3 shows a flowchart for illustrating a method in a radio access network according to one embodiment. The method may run in a node of a radio access network, such as an RNC (Radio Network Controller) in UTRAN or a BSC (Base Station Controller) in GERAN.

The method supports, for a user equipment, a session transfer from a circuit switched network to a packet switched network. In a step S11, a node in the radio access network receives from a control node of a core network a request of information on whether capabilities of the user equipment related to the session transfer are compatible with a network configuration.

Upon receiving the request, the node checks in a step S14 whether the user equipment capability and the network configuration are compatible. Essentially, the RAN needs to check whether a mobility feature is supported by the user equipment. For example, the RAN checks whether the UE capability indicates that the UE supports rSRVCC or a particular type of rSRVCC.

When the RAN receives an indication, e.g. from the control node of the core network, that the check shall only be performed for a particular capability such as a particular rSRVCC capability, then the RAN performs only the check(s) necessary for this capability. By indicating a certain capability, the number of checks to be preformed is reduced and only the checks required by the network and requested by the control node are performed.

The RAN may already know the UE capabilities and can thus perform the requested checks right away. In case the RAN has not already received the capabilities of the UE, the RAN, in an optional step S12, requests the UE to upload or provide its capability information. With the request, the RAN may indicate to the UE at least one particular capability, the RAN is interested in. For example the RAN may indicate that it is interested in the rSRVCC capability of the UE or a certain type of SRVCC capability. The UE than provides the indicated capability information only. In this way the number of capability checks is reduced to the number which is of importance to the network and the amount of data to be uploaded from the UE is correspondingly reduced.

The capability information uploaded by the UE may comprise various types of information relating to the UE capability in general. They may comprise all capability information related to session transfer or to at least one particular capability as explicitly requested by the RAN.

In a step S13, the radio access network receives the requested capability information of the UE. Steps S12 and S13 are optional as the required capability information may already be available at the RAN. The steps may be performed if it is determined that the information requires an update. Steps S12 and S12 are performed in case the capability information is not already available at the RAN or the capability information needs to be updated. Thus the RAN may check first whether the information is available or whether the information requires an update before performing steps S12 and S13.

In a step S15, the RAN indicates to the control node whether the UE capability and the network configuration are compatible. For example, the RAN may indicate for rSRVCC to TDD-LTE "yes" whereas it indicates for rSRVCC to FDD-LTE "no", meaning that the session transfer from the current circuit switched network to TDD-LTE is supported and to FDD-LTE is not supported.

Figure 4:
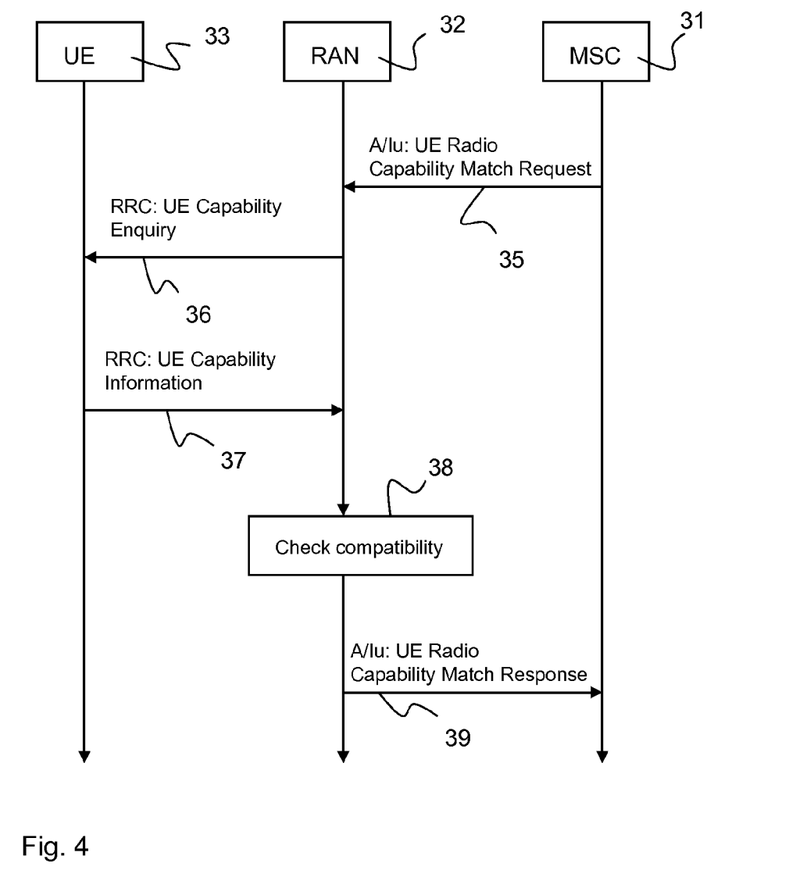
FIG. 4 shows a signaling diagram for illustrating signaling in an embodiment of the invention.

FIG. 4 shows a signaling diagram for illustrating signaling in one embodiment. An MSC 31 of a core network is connected to a RAN 32. Messages between the MSC 31 and the RAN 32 may be exchanged via a respective interface such as the A-interface or the Iu interface. A UE 33 is served by the RAN 32. It may be assumed that the UE is registered in IMS before rSRVCC takes place. The UE may be registered for a voice session. If the UE is registered for another service a re-registration may be necessary when the UE is handed over to the packet switched network. A function T-ADS which is a Terminating Access Domain Selection may be used to ensure that terminated calls are routed correctly, even if camping on a circuit switched network (e.g. a 2G or 3G network). Such a function can ensure terminating on the packet switched networks only if the packet switched access supports IMS voice service.

If the MSC 31 requires more information on the UE capability to be able to set the rSRVCC Indication(s), the MSC 31 may send a "UE Radio Capability Match Request" to the RAN 32.

This procedure is typically used during the Initial Attach procedure, during Location Area Update (LAU) procedure for the "first LAU following GERAN Attach" or for "UE Capability update" (e.g. during an active CS call) or when MSC has not received the Voice Support Match Indicator from the MME (e.g. during SRVCC), SGSN (e.g. during SRVCC) or other MSC (e.g. during MTRF procedure, Mobile Terminating Roaming Forwarding).

In step 35, the MSC 31 indicates whether the MSC 31 wants to receive a "Voice Support Match Indicator". The MSC 31 may indicate whether the RAN 32 should only check for rSRVCC.

In step 36, upon receiving a "UE Radio Capability Match Request" from the MSC 31, if the RAN 32 has not already received the UE capabilities from the UE 33 the RAN 32 requests the UE 33 to upload the UE Capability information by sending the "RRC UE Capability Enquiry".

In step 37, the UE 33 provides the RAN 32 with its UE capabilities sending the "RRC UE Capability Information".

In step 38, upon receiving the "UE Radio Capability Match Request from the MSC" of step 35, the RAN 32 checks whether the UE capabilities are compatible with the network configuration. If requested by the MSC 31, or if configured to do so, the RAN 32 only checks for the rSRVCC capabilities.

In step 39, the RAN 32 provides a "Voice Support Match Indicator" to the MSC 31 to indicate whether the UE capabilities and networks configuration are compatible.

For determining the appropriate "UE Radio Capability Match Response", the RAN 32 is configured, e.g., by an operator to check whether the UE 33 supports certain capabilities required for IMS PS Voice continuity. In a shared network, the RAN 32 keeps a configuration separately per PLMN (Public Land Mobile Network).

The checks which are to be performed depend on network configuration. In the following some examples of UE capabilities are given: the SRVCC/rSRVCC, and UTRAN/E-UTRAN Voice over PS capabilities; the Radio capabilities for GERAN/UTRAN/E-UTRAN FDD and/or TDD; and/or the support of GERAN/UTRAN/E-UTRAN frequency bands.

The MSC 31 stores the received Voice support match indicator in the MM Context (MM: Mobility Management) and uses it as an input for setting the rSRVCC Indication.

The above example can be analogous done for the case of LTE, where the MME makes a query on the capability match of the UE. The rSRVCC capability indication would be provided by the UE to the MME as response to the query of the capability match and then it would be provided by the MME to the MSC Server during SRVCC from LTE to 2G/3G.

Figure 5:
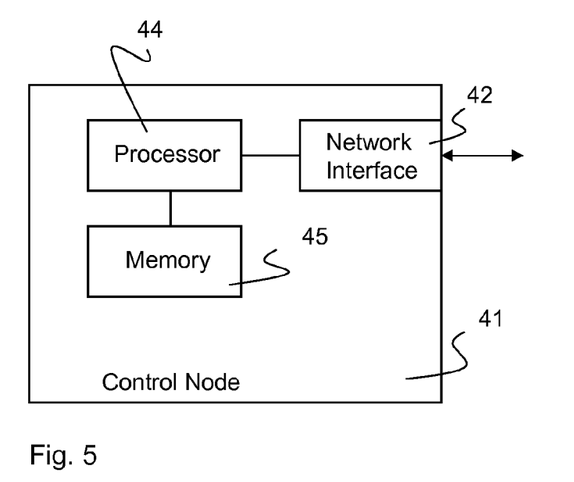
FIG. 5 schematically illustrates a control node of a core network according to one embodiment of the invention.

FIG. 5 schematically illustrates exemplary structures for implementing the above-described concepts in a control node 41 for a core network. The control node 41 for a core network supports, for a user equipment, a session transfer from a circuit switched network to a packet switched network. The control node 41 comprises a network interface 42 to request from a radio access network of the circuit switched network information whether a capability of the user equipment related to the session transfer are compatible with a network configuration related to the session transfer and to receive from the radio access network an indication whether the capability of the user equipment and the network configuration are compatible. Examples of the interface 42 are the A interface or the Iu-CS interface. Examples of the control node 41 are an MSC or an MME.

Further, the control node 41 includes a processor 44 coupled to the network interface 42 and a memory 45 coupled to the processor 44.

The memory 45 may include a read-only memory (ROM), e.g., a flash ROM, a random-access memory (RAM), e.g., a Dynamic RAM (DRAM) or a static RAM (SRAM), a mass storage, e.g., a hard disc drive or a solid state disk, or the like. The memory 45 includes suitably configured program code to be executed by the processor 44 so as to implement the above-described functionalities of the control node 41.

It is to be understood that the structure as illustrated in FIG. 5 is merely schematic and that the control node 41 may actually include further components which, for the sake of clarity, have not been illustrated, e.g., further interfaces. Also, it is to be understood that the memory 45 may include further types of program code modules, which have not been illustrated. For example, the memory 45 may include program code modules for implementing typical functionalities of a respective control node.

Figure 6:
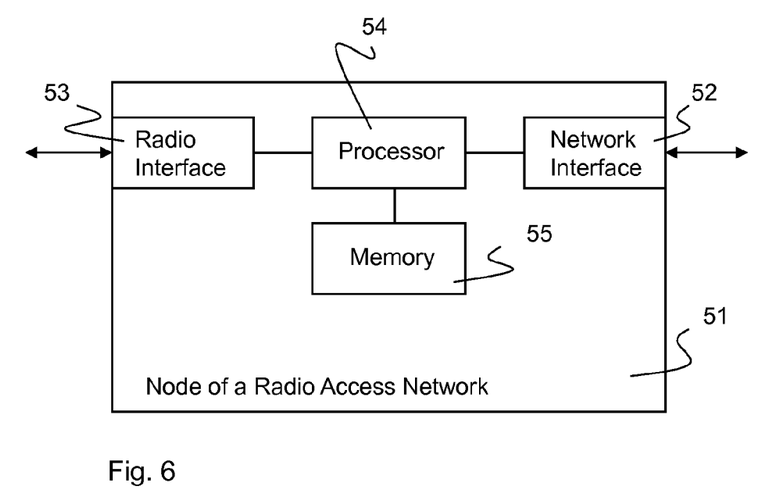
FIG. 6 schematically illustrates a node of a radio access network according to one embodiment of the invention.

FIG. 6 schematically illustrates exemplary structures for implementing the above-described concepts in a node of a radio 51 access network, e.g. a BSC or an RNC.

The node 51 of a radio access network is adapted to support, for a user equipment, a session transfer from a circuit switched network to a packet switched network. In the illustrated structure, the node 51 comprise a network interface 52 for receiving, from a control node of a core network, a request of information on whether a UE capability related to the session transfer are compatible with a network configuration, and for indicating to the control node whether the user capability and the network configuration are compatible.

Further, the node 51 comprises a processor 54 configured to check whether the user equipment capability and the network configuration are compatible; The processor 54 is coupled to the network interface 52, to a radio interface 53 for requesting the user equipment to provide its capability information and for receiving the capability information of the UE and to a memory 55. The memory 55 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 55 includes suitably configured program code to be executed by the processor 54 so as to implement the above-described functionalities of the node 51.

It is to be understood that the structure as illustrated in FIG. 5 is merely schematic and that the node 51 of a radio access network may actually include further components which, for the sake of clarity, have not been illustrated, e.g., further interfaces. Also, it is to be understood that the memory 55 may include further types of program code modules, which have not been illustrated. For example, the memory 55 may include program code modules for implementing typical functionalities of a respective control node.

According to some embodiments, also a computer program product may be provided for implementing concepts according to embodiments of the invention, e.g., a computer-readable medium storing the program code and/or other data to be stored in the memory 45 or the memory 55.

With the above described concepts it can be assured that a session transfer from a circuit switched to a packet switched network is only performed when the UE and the network have matching capabilities. The concepts relate, e.g., to a procedure between a control node of a core network and a RAN to match capabilities regarding session transfer, to a RAN that determines session transfer capability from a circuit switched to a packet switched network upon request of the control node, and to a control node determining whether to indicate that session transfer is supported.

It is to be understood that the examples and embodiments as explained above are merely illustrative and susceptible to various modifications. For example, the concepts could be used in other types of mobile communication networks, not explicitly mentioned so far. Further, it is to be understood that the above concepts may be implemented by using correspondingly designed software in existing nodes, or by using dedicated hardware in the respective nodes.

FIGS. 7 to 10 concern a registration of a user equipment in an IMS in the context of rSRVCC as described so far. Embodiments related to user equipment registration described in the following sections can be considered independently of the already discussed embodiments and also in combination with previously described embodiments.

The technical standard specification 3GPP TS 23.237 V11.4.0, entitled IP Multimedia Subsystem (IMS) Service Continuity, discusses IMS registration and a session transfer from circuit switched to packet switched networks from various perspectives. In Section 6.1.3 of 3GPP it is stated that as a prerequisite for CS to PS SRVCC to be applied, the UE shall be IMS registered over PS. Consequently, the UE needs to be IMS registered before rSRVCC can take place.

The user equipment should be registered for voice, otherwise it would have to re-register when being handed over to e.g. LTE. A Terminating Access Domain Selection (T-ADS) ensures to terminate the IMS voice session on a PS access if the PS access supports IMS voice.

Currently, the user equipment has to register into IMS on e.g. via 2G/3G networks, e.g. GERAN or UTRAN, even if that access does not support IMS Voice over the PS domain. It is an object to improve existing IMS registration concepts and nodes in the context of rSRVCC.

According to one embodiment a method in a control node of a core network for supporting registration of a user equipment in an Internet Protocol Multimedia Subsystem, IMS, is provided. The method comprises the steps: checking whether a session transfer from a circuit switched network to a packet switched network is supported; and if the session transfer is supported, indicating to the user equipment that the session transfer is supported.

According to one embodiment a method in a user equipment for registration of the user equipment in an Internet Protocol Multimedia Subsystem, IMS, is provided. The method comprises the steps: receiving, from a control node of a core network, an indication that a session transfer from a circuit switched network to a packet switched network is supported; checking the received indication; and, if the session transfer is supported, the user equipment registering in the IMS or maintaining its IMS registration.

According to one embodiment a control node of a core network for supporting registration of a user equipment in an Internet Protocol Multimedia Subsystem, IMS, is provided. The control node comprises a processor for checking whether a session transfer from a circuit switched network to a packet switched network is supported and a network interface for indicating to the user equipment that the session transfer is supported, if the session transfer is supported.

According to one embodiment a user equipment for registration of the user equipment in an Internet Protocol Multimedia Subsystem, IMS, is provided. The user equipment comprises a radio interface for receiving an indication that a session transfer from a circuit switched network to a packet switched network is supported and a processor configured to check the received indication and to initiating registration of the user equipment in the IMS or to maintain the IMS registration of the user equipment.

Figure 7:
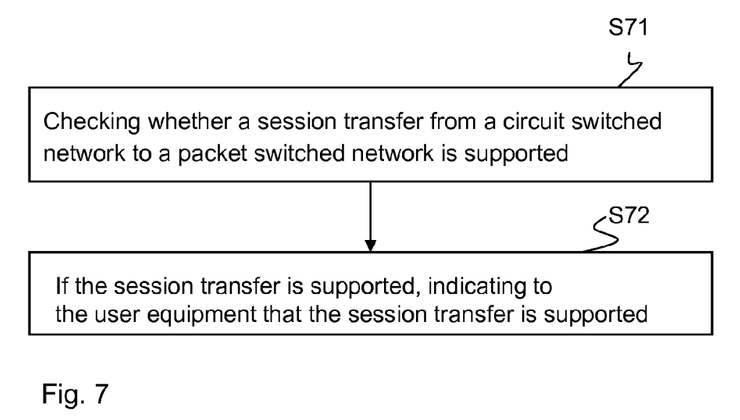
FIG. 7 shows a flowchart for illustrating a method in a control node of a core network according to an embodiment of the invention.

FIG. 7 shows a flowchart of a method in a control node of a core network according to one embodiment. The node may be a Mobile Switching Center (MSC) or a Mobility Management Entity (MME), or in general a function in the core network. The core network is connected with a radio access network that serves a user equipment. The method supports the registration of user equipment in an Internet Protocol Multimedia Subsystem, IMS, by providing relevant information to the user equipment.

In a step S71, the control node checks whether a session transfer from a circuit switched network to a packet switched network is supported. An example network is composed of a circuit switched access network, a circuit switched core network, a packet switched access network, and a packet switched core network. The core network(s) connects the access network(s) with an IMS. An example of a circuit switched access networks are GERAN or UTRAN, which are circuit switched access networks. An example of a packet switched network is an E-UTRAN (evolved UTRAN). It is checked whether the support of a session transfer is supported within a network, at least comprising the circuit switched and the packet switched network and a core network. A session supported to be transferred can, for example, be a voice call or video call.

Examples of a session transfer from a circuit switched to packet switched network are: rSRVCC from GERAN to FDD and/or TDD HSPA, rSRVCC from FDD and/or TDD UTRAN to FDD/TDD HSPA, rSRVCC for GERAN to FDD and/or TDD E-UTRAN, and rSRVCC from FDD and/or TDD UTRAN to FDD/TDD E-UTRAN.

In a step S72, the control node indicating to the user equipment that the session transfer is supported, if the check revealed that the session transfer is supported by the network. The control node may send this information to a radio access network which forwards the information to the user equipment. The indication may be sent in a response to an Attach Request Message sent by the user equipment.

In this way the information whether the network supports session transfer is made available to the user equipment.

Figure 8:
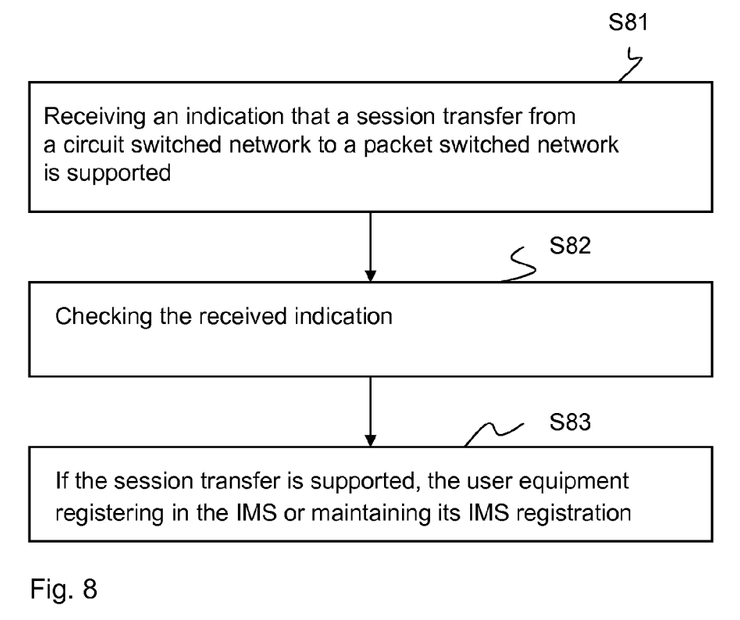
FIG. 8 shows a flowchart for illustrating a method in a user equipment according to one embodiment of the invention.

FIG. 8 shows a flowchart of a method in a user equipment according to one embodiment. The method registers the user equipment in an Internet Protocol Multimedia Subsystem.

In a step S81, the user equipment receives from a control node of a core network, an indication that a session transfer from a circuit switched network to a packet switched network is supported. The received indication in step S81 corresponds to the indication of step S72 in FIG. 7.

In step S82, the received indication is checked by the user equipment and when the check reveals that the session transfer is supported, the user equipment will in a step S83 register in the IMS or maintain its IMS registration in case the registration is already in existence.

Typically the IMS registration is done via the packet switched network. The registration can in particularly be made for a voice session. The registration is also made if there is no indication that the session, such as a voice session, is supported in the packet switched network or if an indication explicitly states that the session is not supported by the packet switched access network.

With respect to FIG. 7 embodiments from a control node perspective are described, whereas with respect to FIG. 8 embodiments from a user equipment perspective are described.

The following example further illustrates various embodiments. A user equipment is currently camping on a 2G or 3G network, e.g. GERAN or UTRAN. The user equipment receives the indication that session transfer from circuit switched network to a packet switched network (rSRVCC) is supported from a MSC Server. The indication is received from the MSC in response to an Attach Request message previously send by the user equipment. The user equipment registers in the IMS. The registration is done even if there is no indication saying that IMS Voice is supported from the packet switched network or if there is an indication stating that IMS voice is not supported. Alternatively, the user equipment maintains its IMS registration that was initiated on an IMS Voice capable access or on 2G/3G. For this example it is important to note, that T-ADS (Terminating Access Domain Selection) in the IMS ensures that terminated calls are not routed to PS access if the PS access does not support IMS voice over PS. Embodiments suggest that the MSC Server informs the UE that rSRVCC is possible and that a user equipment performs IMS registration for voice also when currently used PS access does not support IMS Voice over PS. With it the UE is registered in the IMS on 2G/3G for voice also when the currently used access does not support IMS voice.

Figure 9:
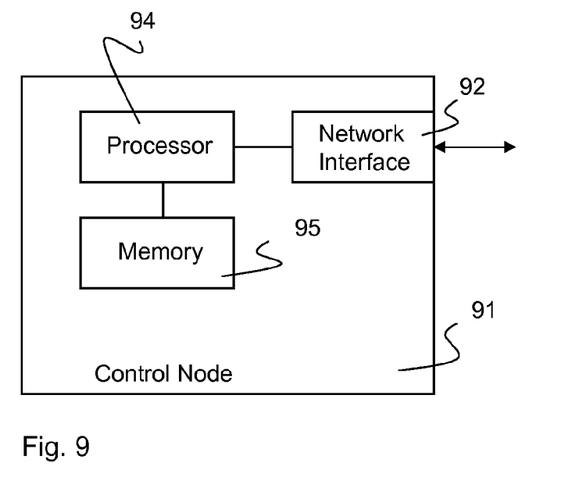
FIG. 9 schematically illustrates a control node of a core network according to one embodiment of the invention.

FIG. 9 schematically shows exemplary structures for implementing the above-described concepts in a control node 91 for a core network. The control 91 is configured to support a registration of a user equipment in an Internet Protocol Multimedia Subsystem, IMS. The control node 91 comprises a processor 94 for checking whether a session transfer from a circuit switched network to a packet switched network is supported, and a network interface 92 for indicating to the user equipment that the session transfer is supported, if the session transfer is supported. Further the control node includes a memory 45 coupled to the processor.

The memory 95 may include a read-only memory (ROM), e.g., a flash ROM, a random-access memory (RAM), e.g., a Dynamic RAM (DRAM) or a static RAM (SRAM), a mass storage, e.g., a hard disc drive or a solid state disk, or the like. The memory 95 includes suitably configured program code to be executed by the processor 94 so as to implement the above-described functionalities of the control node 91.

It is to be understood that the structure as illustrated in FIG. 9 is merely schematic and that the control node 91 may actually include further components which, for the sake of clarity, have not been illustrated, e.g., further interfaces. Also, it is to be understood that the memory 95 may include further types of program code modules, which have not been illustrated. For example, the memory 95 may include program code modules for implementing typical functionalities of a respective control node.

Figure 10:
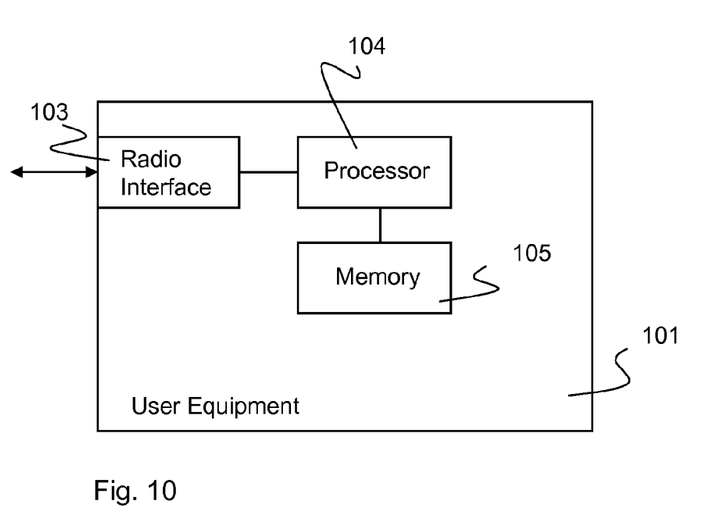
FIG. 10 schematically illustrates a user equipment according to one embodiment of the invention.

FIG. 10 schematically shows exemplary structures for implementing the above-described concepts in a user equipment 101. The user equipment is configured for registration in an Internet Protocol Multimedia Subsystem, IMS. The user equipment 101 comprises a radio interface 103 for receiving an indication that a session transfer from a circuit switched network to a packet switched network is supported; and a processor 104 configured to check the received indication and to initiating registration of the user equipment in the IMS or to maintain the IMS registration of the user equipment. The processor 104 is coupled to a memory 105.

The memory 105 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 105 includes suitably configured program code to be executed by the processor 104 so as to implement the above-described functionalities of the node user equipment 101

It is to be understood that the structure as illustrated in FIG. 10 is merely schematic and that the user equipment 101 may actually include further components which, for the sake of clarity, have not been illustrated, e.g., further interfaces. Also, it is to be understood that the memory 105 may include further types of program code modules, which have not been illustrated. For example, the memory 105 may include program code modules for implementing typical functionalities of the user equipment 101.

According to some embodiments, also a computer program product may be provided for implementing concepts according to embodiments of the invention, e.g., a computer-readable medium storing the program code and/or other data to be stored in the memory 95 or the memory 105.

It is to be understood that the examples and embodiments as explained above are merely illustrative and susceptible to various modifications. For example, the concepts could be used in other types of mobile communication networks, not explicitly mentioned so far. Further, it is to be understood that the above concepts may be implemented by using correspondingly designed software in existing nodes, or by using dedicated hardware in the respective nodes.

The invention claimed is:

1. A method for operating a control node of a core network for supporting, for a user equipment, a session transfer from a circuit switched network to a packet switched network, the method comprising:
   the control node requesting, from a radio access network of the circuit switched network, information on whether a capability of the user equipment related to the session transfer from the circuit switched network to the packet switched network is compatible with a network configuration related to the session transfer;
   the control node receiving, from the radio access network, a first indication indicating whether the capability of the user equipment and the network configuration are compatible;
   the control node determining whether to indicate that the session transfer is supported based on the received first indication; and
   the control node setting a second indication indicating whether the session transfer is supported according to the determination, wherein the second indication is distinct from the first indication.

2. The method of claim 1, wherein the determining whether to indicate that the session transfer is supported is further based on further information available at the control node.

3. The method of claim 1, wherein the circuit switched network comprises a UTRAN or a GERAN.

4. The method of claim 1, wherein the packet switched network comprises an E-UTRAN or a HSPA network.

5. The method of claim 1, wherein the capability of the user equipment comprises a return Single Radio Voice Call Continuity (rSRVCC) capability.

6. The method of claim 1, wherein the capability of the user equipment comprises a capability of the user equipment to support least one of:
   a frequency division duplex (FDD) mode of the circuit switched network and/or the packet switched network;
   a time division duplex (TDD) mode of the circuit switched network and/or the packet switched network;
   both a FDD mode and a TDD mode of the circuit switched network and/or the packet switched network.

7. The method of claim 1, wherein the capability of the user equipment comprises a capability of the user equipment to support a certain frequency band of the circuit switched network and/or the packet switched network.

8. The method of claim 1, wherein the control node requesting the information comprises the control node indicating a selected capability of the user equipment.

9. A method for operating a first node of a radio access network for supporting, for a user equipment, a session transfer from a circuit switched network to a packet switched network, the method comprising:
   the first node receiving, from a control node of a core network, a request of information on whether a capability of the user equipment related to the session transfer from the circuit switched network to the packet switched network is compatible with a network configuration;
   the first node checking whether the user equipment capability and the network configuration are compatible;
   the first node indicating, to the control node, whether the user equipment capability and the network configuration are compatible.

10. The method of claim 9, further comprising:
    the first node requesting the user equipment to provide its capability information;
    the first node receiving the capability information of the user equipment.

11. The method of claim 10, further comprising the first node indicating, to the user equipment, a selected capability of the user equipment related to the session transfer.

12. The method of claim 9, wherein the capability of the user equipment comprises a capability of the user equipment to support least one of:
    a frequency division duplex (FDD) mode of the circuit switched network and/or the packet switched network;
    a time division duplex (TDD) mode of the circuit switched network and/or the packet switched network;
    both a FDD mode and a TDD mode of the circuit switched network and/or the packet switched network.

13. The method of claim 9, wherein the capability of the user equipment comprises a capability of the user equipment to support a certain frequency band of the circuit switched network and/or the packet switched network.

14. A control node for a core network and for supporting, for a user equipment, a session transfer from a circuit switched network to a packet switched network, the control node comprising a processor and a memory, the memory containing instructions executable by the processor whereby the control node is operative to:
    request, from a radio access network of the circuit switched network, information on whether a capability of the user equipment related to the session transfer from the circuit switched network to the packet switched network are compatible with a network configuration related to the session transfer;
    receive from the radio access network a first indication indicating whether the capability of the user equipment and the network configuration are compatible;
    determine whether to indicate that the session transfer is supported based on the received first indication; and
    set a second indication indicating whether the session transfer is supported according to the determination, wherein the second indication is distinct from the first indication.

15. The control node of claim 14, wherein the memory contains instructions executable by the processor whereby the control node is configured to determine whether to indicate that the session transfer is supported further based on further information available at the control node.

16. The control node of claim 14, wherein the circuit switched network comprises an UTRAN or a GERAN.

17. The control node of claim 14, wherein the packet switched network comprises an E-UTRAN or a HSPA network.

18. A node of a radio access network for supporting, for a user equipment, a session transfer from a circuit switched network to a packet switched network, the node comprising a processor and a memory, the memory containing instructions executable by the processor whereby the node is operative to:
    receive, from a control node of a core network, a request of information on whether a capability of the user equipment related to the session transfer from the circuit switched network to the packet switched network is compatible with a network configuration;
    check whether the user equipment capability and the network configuration are compatible; and indicate, to the control node, whether the user capability and the network configuration are compatible.

19. A computer program product stored in a non-transitory computer readable medium for operating a control node of a core network for supporting, for a user equipment, a session transfer from a circuit switched network to a packet switched network, the computer program product comprising software instructions which, when run on a processor of the control node, causes the control node to:

request, from a radio access network of the circuit switched network, information on whether a capability of the user equipment related to the session transfer from the circuit switched network to the packet switched network are compatible with a network configuration related to the session transfer;

receive, from the radio access network, a first indication whether the capability of the user equipment and the network configuration are compatible;

determining whether to indicate that the session transfer is supported based on the received first indication; and setting a second indication indicating whether the session transfer is supported according to the determination, wherein the second indication is distinct from the first indication.

20. A computer program product stored in a non-transitory computer readable medium for operating a first node of a radio access network for supporting, for a user equipment, a session transfer from a circuit switched network to a packet switched network, the computer program product comprising software instructions which, when run on a processor of the first node, causes the first node to:

receive, from a control node of a core network, a request of information on whether a capability of the user equipment related to the session transfer from the circuit switched network to the packet switched network is compatible with a network configuration;

check whether the user equipment capability and the network configuration are compatible;

indicate, to the control node, whether the user equipment capability and the network configuration are compatible.

* * * * *

UNITED STATES PATENT AND TRADEMARK OFFICE
CERTIFICATE OF CORRECTION

PATENT NO. : 9,924,414 B2
APPLICATION NO. : 14/401150
DATED : March 20, 2018
INVENTOR(S) : Keller et al.

It is certified that error appears in the above-identified patent and that said Letters Patent is hereby corrected as shown below:

On the Title Page

In Item (57), under "ABSTRACT", in Column 2, Line 3, delete "packets witched" and insert -- packet switched --, therefor.

In the Specification

In Column 1, Line 67, delete "High Speed Packed" and insert -- High Speed Packet --, therefor.

In Column 6, Line 51, delete "preformed" and insert -- performed --, therefor.

In Column 12, Line 3, delete "control 91" and insert -- control node 91 --, therefor.

In Column 12, Line 47, delete "user equipment 101" and insert -- user equipment 101. --, therefor.

In the Claims

In Column 13, Line 39, in Claim 6, delete "support least" and insert -- support at least --, therefor.

In Column 14, Line 11, in Claim 12, delete "support least" and insert -- support at least --, therefor.

Signed and Sealed this
Second Day of October, 2018

Andrei Iancu
*Director of the United States Patent and Trademark Office*